March 29, 1966 J. R. CURRIE 3,243,791

BI-CARRIER DEMODULATOR WITH MODULATION

Filed Sept. 20, 1963

INVENTOR.
JAMES R. CURRIE
BY [signature]
ATTORNEYS 3,243,791

BI-CARRIER DEMODULATOR WITH MODULATION

James R. Currie, Huntsville, Ala., assignor to the United States of America as represented by the Administrator of the National Aeronautics and Space Administration Filed Sept. 20, 1963, Ser. No. 310,507
10 Claims. (Cl. 340—198)

Figures 1, 2:
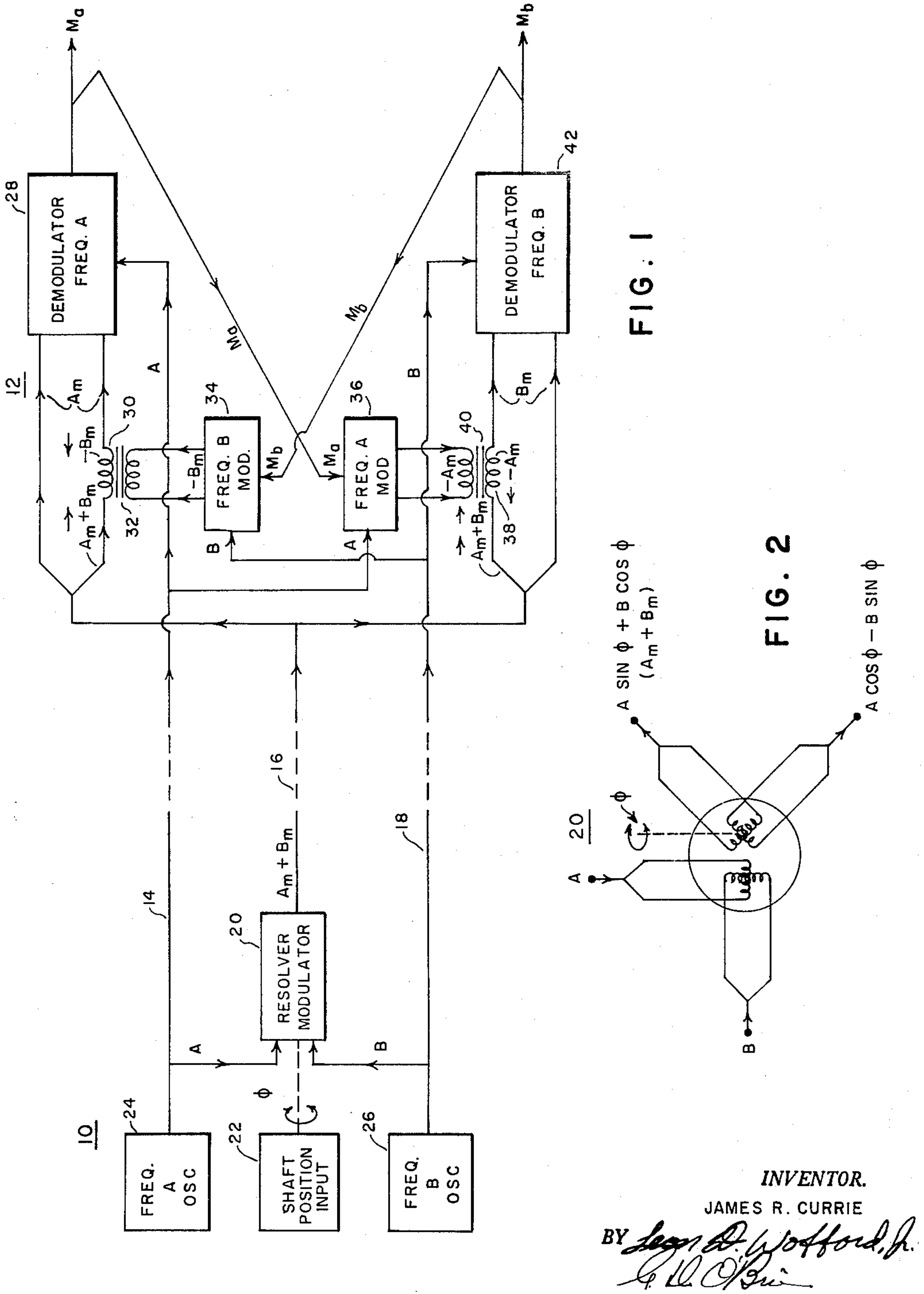

The invention described herein may be manufactured and used by or for the Government of the United States of America for governmental purposes without the payment of any royalties thereon or therefor.

This invention relates to electrical detectors or demodulators and particularly to demodulators or demodulating systems which must successfully demodulate simultaneously two, closely related in frequency, modulated alternating current signal carriers.

There are many instances where intelligence is impressed or appears upon two electrical carriers which do not differ substantially in frequency. Successful detection, or demodulation, of the intelligence on one or both of such carriers has always posed a problem. The normal approach has been through pre-detection selective filtering followed by conventional demodulation. That is, selective circuits are employed which allowed to pass only one of the two frequencies which is then demodulated. However, as the carrier frequencies appear closer in frequency these circuits must be extremely selective with the attendant result that any variations in frequency of the carriers render the filters ineffective. Further, as carrier frequencies are reduced, as for example down to the audio range, the components normally used, e.g., inductors and capacitors, become quite large, critical in choice and expensive.

It is an object of this invention to provide demodulation means which overcome the aforehaid disadvantages and provides effective means of demodulating two closely spaced carriers, which eliminates the need for filter elements, and is effective even though the carriers vary in frequency both absolutely and with respect to one another.

In accordance with the invention a signal containing two modulated carriers is demodulated by a first synchronous demodulator with a keying input of one of the carrier frequencies and by a second synchronous demodulator with a keying frequency of the other of the carrier frequencies. Prior to each instance of demodulation the unwanted carrier is subtracted out by a unique circuitry arrangement. Two new modulated carriers are created to serve as the appropriate subtrahends in this arrangement and these modulated carriers are separately created by taking an output of each of the demodulators and impressing it on a corresponding frequency carrier, otherwise without modulation. By this system of demodulation the separate demodulator outputs are substantially free of products of the other.

Other objects, features and advantages of the invention will appear more fully from the following description and claims when considered in conjunction with the accompanying drawings in which:

FIGURE 1 is an electrical schematic diagram of an embodiment of the invention; and FIGURE 2 is a schematic diagram of a resolver type modulator shown in block form in FIGURE 1.

Referring now to the drawings, FIGURE 1 basically consists of modulation circuit 10 and demodulation circuit 12, which may be adjacent or physically separated, but in either event electrically connected as by conductors 14, 16, and 18. As a specific illustration of an application of the present invention the modulation involved is provided by resolver modulator 20, which in response to a shaft position input 22, impresses modulation $M_a$ and $M_b$ on carrier signals A and B, respectively. Frequency A is obtained from oscillator 24 and frequency B from oscillator 26. The output of modulator 20 is the sum of the modulator carriers and is designated $A_m+B_m$. This output, which appears on conductor 16, is further illustrated in FIGURE 2 as being representative of an output $A \sin \phi+B \cos \phi$ of modulator 20 wherein $\phi$ represents the angle of rotation as illustrated in FIGURES 1 and 2. A more complex application of resolver modulation is illustrated in pending patent application entitled "Trigonometric System," Serial No. 260,087, filed February 20, 1963. As illustrated therein a chain of seven resolvers is fed carrier signals of 1600 cycles and 1800 cycles and modulation derived from 7 shaft positions representative of navigational information is combined to produce solutions of complex guidance problems when these frequencies are separated and demodulated. It is the particular role of this invention to accomplish such separation and demodulation.

In the example illustrated herein, the invention is particularly concerned with the recovery of modulation information impressed upon carriers A and B by resolver modulator 20 as separate bits of modulation information. In accordance with the invention, this is accomplished by unique circuitry wherein no highly selective filtering means, as such, are employed. The output of resolver modulator 20, $A_m+B_m$, is combined in a bucking fashion with an oppositely phased version $B_m$, or $-B_m$, and applied as $A_m$ to an input of frequency A demodulator 28. $-B_m$, which appears on winding 30 of transformer 32, and is algebraically added to $A_m+B_m$, is obtained from modulator 34. Similarly an $A_m+B_m$ signal from modulator 20 is combined with $-A_m$ signal obtained from modulator 36, and appearing on winding 38 of transformer 40, and the resultant, $B_m$, applied to frequency B demodulator 42. The interconnection of conductor 16 and windings 30 and 38, respectively, provide separate combining means.

Demodulator 28, a conventional synchronous type demodulator, is fed a keying signal A synchronized in frequency and phase with or furnished directly from oscillator 24. In like manner, demodulator 42, of the same type, is fed a frequency B signal synchronized in frequency and phase with or fed directly from oscillator 26. Thus, demodulator 28 provides an output representative of the modulation $M_a$ on carrier A and demodulator 42 provides an output representative of the modulation $M_b$ on carrier B. These outputs would normally contain distortion products due to the component of frequency B being present and, in the case of the output of demodulator 42 would contain distortion products due to the component of frequency A being present. These distortion products are substantially eliminated by feeding an output of frequency A demodulator 28 to frequency A modulator 36 wherein it modulates a frequency A input (as from oscillator 24), and by feeding an output of frequency B demodulator 42 to frequency B modulator 34 wherein it modulates a frequency B input (as from oscillator 26). Component $-B_m$ is substantially purely obtained from modulator 34 and component $-A_m$ is substantially purely obtained from modulator 36 by correct amplitude adjustments of this crisscross feedback between demodulators 28 and 42 and modulators 34 and 36, the distortion products being very effectively removed or nulled out. The overall result is that $M_a$, modulation from carrier A, is substantially free of any modulation originally impressed upon carrier B and, vice versa, modulation $M_b$, the modulation appearing on carrier B, is substantially free of any modulation of carrier A. With the frequencies of 1600 and 1800 cycles mentioned above, representative of frequency differences of significantly less than 20% of either frequency, excellent results have been obtained.

While there has been shown a particular embodiment of the invention, it will of course be understood that the invention is not to be limited thereto since various modifications may be made and it is contemplated by the appended claims to cover those modifications which fall within the true spirit and scope of the invention.

What is claimed is:

1. A bi-carrier modulator and demodulator comprising:
(a) first carrier means for providing an alternating first signal carrier A;
(b) second carrier means for providing an alternating current second signal carrier B;
(c) input modulation means for providing a modulated signal $A_m+B_m$ consisting substantially of:
(1) said alternating first signal carrier A modulated by a first modulating signal $M_a$, and
(2) said alternating second signal carrier B modulated by a second modulating signal $M_b$;
(d) first combining means responsive to a modulated output $A_m+B_m$ from said input modulation means and an oppositely phased second modulation signal $-B_m$ for providing a separate said first modulated carrier $A_m$ output;
(e) second combining means responsive to said modulated output $A_m+B_m$ and an oppositely phased first modulation signal $-A_m$ for providing a separate said second modulation signal $B_m$ output;
(f) frequency A demodulation means responsive to said first combining means output $A_m$ and to a keying signal synchronized in frequency and phase with said alternating first signal carrier A for providing a said first modulation signal output $M_a$;
(g) frequency B demodulation means responsive to said second combining means output $B_m$ and to a keying signal synchronized in frequency and phase with said alternating second signal carrier B for providing a said second modulation signal output $M_b$;
(h) frequency B modulation means responsive to said second carrier B from said second carrier means and said second modulation signal output $M_b$ from said frequency B demodulation means for providing to said first combining means said oppositely phased second modulation signal $-B_m$; and
(i) frequency A modulation means responsive to said first carrier A from said first carrier means and said first modulation signal output $M_a$ from said frequency A demodulation means for providing to said second combining means said oppositely phased first modulation signal $-A_m$.

2. A bi-carrier modulator and demodulator comprising:
(a) first carrier means for providing an alternating current first signal carrier output A;
(b) second carrier means for providing an alternating current second signal carrier output B;
(c) input modulation means for providing a modulated signal $A_m+B_m$ consisting substantially of:
(1) said alternating first signal carrier A modulated by a first modulating signal $M_a$, and
(2) said alternating second signal carrier B modulated by a second modulating signal $M_b$;
(d) first combining means responsive to a modulated output $A_m+B_m$ from said input modulation means and an oppositely phased second modulation signal $-B_m$ for providing a separate said first modulated carrier $A_m$ output;
(e) second combining means responsive to said modulated output $A_m+B_m$ and an oppositely phased first modulation signal $-A_m$ for providing a separate said second modulation signal $B_m$ output;
(f) frequency A demodulation means responsive to said first combining means output $A_m$ and said first signal carrier output A for providing a said first modulation signal output $M_a$;
(g) frequency B demodulation means responsive to said second combining means output $B_m$ and said second signal carrier output B for providing a said second modulation signal output $M_b$;
(h) frequency B modulation means responsive to said second signal carrier output B and said second modulation signal output $M_b$ from said frequency B demodulation means for providing to said first combining means said oppositely phased second modulation signal $-B_m$; and
(i) frequency A modulation means responsive to said first signal carrier output A and said first modulation signal output $M_a$ from said frequency A demodulation means for providing to said second combining means said oppositely phased first modulation signal $-A_m$.

3. A bi-carrier modulator and demodulator comprising:
(a) first carrier means for providing an alternating current first signal carrier A;
(b) second carrier means for providing an alternating current second signal carrier B differing in frequency from signal carrier A by less than 25% of signal carrier B;
(c) input modulation means for providing a modulated signal $A_m+B_m$ consisting substantially of:
(1) said alternating first signal carrier A modulated by a first modulating signal $M_a$, and
(2) said alternating second signal carrier B modulated by a second modulating signal $M_b$;
(d) first combining means responsive to a modulated output $A_m+B_m$ from said input modulation means and an oppositely phased second modulation signal $-B_m$ for providing a separate said first modulated carrier $A_m$ output;
(e) second combining means responsive to said modulated output $A_m+B_m$ and an oppositely phased first modulation signal $-A_m$ for providing a separate said second modulation signal $B_m$ output;
(f) frequency A demodulation means responsive to said first combining means output $A_m$ and said first signal carrier A for providing a said first modulation signal output $M_a$;
(g) frequency B demodulation means responsive to said second combining means output $B_m$ and said second signal carrier B for providng a said second modulation signal output $M_b$;
(h) frequency B modulation means responsive to said second carrier B from said second carrier means and said second modulation signal output $M_b$ from said frequency B demodulation means for providing to said first combining means said oppositely phased second modulation signal $-B_m$; and
(i) frequency A modulation means responsive to said first carrier A from said first carrier means and said first modulation signal output $M_a$ from said frequency A demodulation means for providing to said second combining means said oppositely phased first modulation signal $-A_m$.

4. A bi-carrier modulator and demodulator comprising:
(a) first carrier means for providing an alternating current first signal carrier A in the audio frequency range;
(b) second carrier means for providing an alternating current second signal carrier B differing in frequency from signal carrier A by less than 25% of signal carrier B;
(c) input modulation means for providing a modulated signal $A_m+B_m$ consisting substantially of:
(1) said alternating current first signal carrier A modulated by a first modulating signal $M_a$, and
(2) said alternating current second signal carrier B modulated by a second modulating signal $M_b$;
(d) first combining means responsive to a modulated output $A_m+B_m$ from said input modulation means and an oppositely phased second modulation signal $-B_m$ for providing a separate said first modulated carrier $A_m$ output;

(e) second combining means responsive to said modulated output $A_m+B_m$ and an oppositely phased first modulation signal $-A_m$ for providing a separate said second modulation signal $B_m$ output;

(f) frequency A demodulation means responsive to said first combining means output $A_m$ and said first signal carrier A for providing a said first modulation signal output $M_a$;

(g) frequency B demodulation means responsive to said second combining means output $B_m$ and said second signal carrier B for providing a said second modulation signal output $M_b$;

(h) frequency B modulation means responsive to said second carrier B from said second carrier means and said second modulation signal output $M_b$ from said frequency B demodulation means for providing to said first combining means said oppositely phased second modulation signal $-B_m$; and (i) frequency A modulation means responsive to said first carrier A from said first carrier means and said first modulation signal output $M_a$ from said frequency A demodulation means for providing to said second combining means said oppositely phased first modulation signal $-A_m$.

5. A bi-carrier modulator and demodulator comprising:

(a) input modulation means for providing a modulated signal $A_m+B_m$ consisting substantially of:

(1) a first carrier A modulated by a first modulating signal $M_a$, and (2) a second carrier B modulated by a second modulating signal $M_b$;

(b) first combining means responsive to a modulated output $A_m+B_m$ from said input modulation means and an oppositely phased second modulation signal $-B_m$ for providing a separate said first modulated carrier $A_m$ output;

(c) second combining means responsive to said modulated output $A_m+B_m$ and an oppositely phased first modulation signal $-A_m$ for providing a separate said second modulation signal $B_m$ output;

(d) frequency A demodulation means responsive to said first combining means output $A_m$ and to a keying signal synchronized in frequency and phase with said first carrier A for providing a said first modulation signal output $M_a$;

(e) frequency B demodulation means responsive to said second combining means output $B_m$ and to a keying signal synchronized in frequency and phase with said second carrier B for providing a said second modulation signal output $M_b$;

(f) frequency B modulation means responsive to a said second carrier B and said second modulation signal output $M_b$ from said frequency B demodulation means for providing to said first combining means said oppositely phased second modulation signal $-B_m$; and (g) frequency A modulation means responsive to a said first carrier A and said first modulation signal output $M_a$ from said frequency A demodulation means for providing to said second combining means said oppositely phased first modulation signal $-A_m$.

6. A bi-carrier modulator and demodulator comprising:

(a) input modulation means for providing a modulated signal $A_m+B_m$ consisting substantially of:

(1) a first carrier A modulated by a first modulating signal $M_a$, and (2) a second carrier B modulated by a second modulating signal $M_b$;

(b) first combining means responsive to a modulated output $A_m+B_m$ from said input modulation means and an oppositely phased second modulation signal $-B_m$ for providing a separate said first modulated carrier $A_m$ output;

(c) second combining means responsive to said modulated output $A_m+B_m$ and an oppositely phased first modulation signal $-A_m$ for providing a separate said second modulation signal $B_m$ output;

(d) frequency A demodulation means responsive to said first combining means output $A_m$ and a said carrier A for providing a said first modulation signal output $M_a$;

(e) frequency B synchronous demodulation means responsive to said second combining means output $B_m$ and a said carrier B for providing a said second modulation signal output $M_b$;

(f) frequency B synchronous modulation means responsive to said second carrier B and said second modulation signal output $M_b$ from said frequency B demodulation means for providing to said first combining means said oppositely phased second modulation signal $-B_m$; and (g) frequency A modulation means responsive to said first carrier A and said first modulation signal output $M_a$ from said frequency A demodulation means for providing to said second combining means said oppositely phased first modulation signal $-A_m$.

7. A bi-carrier modulator and demodulator comprising:

(a) input modulation means including an electro-mechanical resolver for providing as a function of the setting of said resolver a modulated signal $A_m+B_m$ consisting substantially of:

(1) a first carrier A modulated by a first modulating signal $M_a$, and (2) a second carrier B modulated by a second modulating signal $M_b$.

(b) first combining means responsive to a modulated input $A_m+B_m$ from said input modulation means and an oppositely phased second modulation signal input $-B_m$ for providing a separate said first modulated carrier $A_m$ output;

(c) second combining means responsive to said modulated input $A_m+B_m$ and an oppositely phased first modulation signal input $-A_m$ for providing a separate said second modulation signal $B_m$ output;

(d) frequency A synchronous demodulation means responsive to said first combining means output $A_m$ and a said carrier A for providing a said first modulation signal output $M_a$;

(e) frequency B synchronous demodulation means responsive to said second combining means output $B_m$ and a said carrier B for providing a said second modulation signal output $M_b$;

(f) frequency B synchronous modulation means responsive to said second carrier B and said second modulation signal output $M_b$ from said frequency B demodulation means for providing to said first combining means said oppositely phased second modulation signal $-B_m$; and (g) frequency A synchronous modulation means responsive to said first carrier A and said first modulation signal output $M_a$ from said frequency A demodulation means for providing to said second combining means said oppositely phased first modulation signal $-A_m$.

8. A bi-carrier modulator and demodulator as set forth in claim 7, wherein said carrier A is in the audio frequency range and carrier B differs in frequency from carrier A by less than approximately 20% of carrier B.

9. A bi-carrier modulator and demodulator as set forth in claim 8, wherein each said combining means comprises adding means for algebrically adding said inputs.

10. A bi-carrier modulator and demodulator as set forth in claim 9, wherein each said adding means includes a transformer winding to which one of said inputs is transformer coupled and the other said input is connected in series with an opposing said one of said inputs.

(References on following page)

References Cited by the Examiner

UNITED STATES PATENTS

| | | | |
|---|---|---|---|
| 2,779,020 | 1/1957 | Wilmotte | 177—15 |
| 3,031,529 | 4/1962 | Colodny | 179—15 |
| 3,117,186 | 1/1964 | Burden et al. | 179—15 |

OTHER REFERENCES

RCA Technical Notes No. 326, November 1959, McCoy—AM Sideband Stereophonic System.

ROY LAKE, *Primary Examiner.*

ALFRED BRODY, *Examiner.*